United States Patent
Mao et al.

(10) Patent No.: US 9,070,960 B2
(45) Date of Patent: Jun. 30, 2015

(54) TM MODE DIELECTRIC RESONATOR FILTER INCLUDING A DIELECTRIC RESONANT COLUMN SECURED WITHIN A RESONANT CAVITY BY ELASTIC DEFORMATION

(71) Applicant: Huawei Technologies Co., Ltd., Shenzhen (CN)

(72) Inventors: Yan Mao, Shanghai (CN); Lei Cai, Shenzhen (CN); Yuntao Zhu, Shenzhen (CN); Shengjun Ou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/781,014

(22) Filed: Feb. 28, 2013

(65) Prior Publication Data
US 2013/0176088 A1 Jul. 11, 2013

Related U.S. Application Data

(63) Continuation of application No. PCT/CN2011/075294, filed on Jun. 3, 2011.

(30) Foreign Application Priority Data

Sep. 3, 2010 (CN) .......................... 2010 1 0276357

(51) Int. Cl.
*H01P 1/20* (2006.01)
*H01P 7/10* (2006.01)
(Continued)

(52) U.S. Cl.
CPC ................ *H01P 7/10* (2013.01); *H01P 1/2084* (2013.01); *H04W 88/08* (2013.01); *H01P 1/2002* (2013.01)

(58) Field of Classification Search
CPC .................................. H01P 1/2084; H01P 7/10
USPC ............................................... 333/202, 219.1
See application file for complete search history.

(56) References Cited

U.S. PATENT DOCUMENTS

| 7,106,152 B2 | 9/2006 | Yamakawa et al. |
| 2001/0052833 A1 | 12/2001 | Enokihara et al. |
| 2002/0171509 A1 | 11/2002 | Ando et al. |

(Continued)

FOREIGN PATENT DOCUMENTS

| CN | 1330430 A | 1/2002 |
| CN | 1389001 A | 1/2003 |

(Continued)

OTHER PUBLICATIONS

Extended European Search Report issued in corresponding European Patent Application No. 11786126.0, mailed Jun. 3, 2013, 6 pages.

(Continued)

*Primary Examiner* — Benny Lee
(74) *Attorney, Agent, or Firm* — Brinks Gilson & Lione

(57) ABSTRACT

The present invention relates to a resonator and discloses a transverse magnetic mode dielectric resonator, a transverse magnetic mode dielectric filter, and a base station. By using the present invention, good contact between contact surfaces and convenient assembly can be achieved. Moreover, the transverse magnetic mode dielectric resonator according to the embodiments of the present invention has good structure stability, convenient assembly, and strong realizability, thereby being suitable for mass production and having good mass production consistency.

15 Claims, 5 Drawing Sheets

(51) Int. Cl.
*H01P 1/208* (2006.01)
*H04W 88/08* (2009.01)

(56) References Cited

U.S. PATENT DOCUMENTS

| | | | |
|---|---|---|---|
| 2004/0174234 A1* | 9/2004 | Enokihara et al. | 333/202 |
| 2005/0030131 A1 | 2/2005 | Yamakawa et al. | |
| 2010/0308937 A1* | 12/2010 | Myllyvainio et al. | 333/202 |

FOREIGN PATENT DOCUMENTS

| | | |
|---|---|---|
| CN | 1581569 A | 2/2005 |
| CN | 101546857 A | 9/2009 |
| CN | 102148417 A | 8/2011 |
| DE | 4113302 A1 | 10/1992 |
| EP | 1505687 A1 | 2/2005 |
| JP | 2002094308 | 3/2002 |
| WO | WO 2009/096836 A1 | 8/2009 |
| WO | WO 2010/013982 A2 | 2/2010 |

OTHER PUBLICATIONS

Written Opinion of the International Searching Authority issued in corresponding PCT Patent Application No. PCT/CN2011/075294, mailed Sep. 22, 2011.

International Search Report issued in corresponding PCT Patent Application No. PCT/CN2011/075294, mailed Sep. 22, 2011.

Office Action issued in corresponding Chinese Patent Application No. 201010276357.4, mailed Dec. 25, 2012.

* cited by examiner

US 9,070,960 B2

TM MODE DIELECTRIC RESONATOR FILTER INCLUDING A DIELECTRIC RESONANT COLUMN SECURED WITHIN A RESONANT CAVITY BY ELASTIC DEFORMATION

CROSS-REFERENCE TO RELATED APPLICATIONS

This application is a continuation of International Application No. PCT/CN2011/075294, filed on Jun. 3, 2011, which claims priority to Chinese Patent Application No. 201010276357.4, filed on Sep. 3, 2010, both of which are hereby incorporated by reference in their entireties.

FIELD OF THE INVENTION

The present invention relates to a resonator, and particularly, to a transverse magnetic (TM: Transverse Magnetic) mode dielectric resonator, a transverse magnetic mode dielectric filter, and a base station.

BACKGROUND OF THE INVENTION

With the development of a wireless communication technology, a wireless communication system raises higher requirements on high sensitivity transmitting, high sensitivity receiving, and high quality of voice communication. For a filter in a base station, it is necessary to achieve less insertion loss and better suppression performance. In addition, with regard to the filter, a strong desire for reducing the size of the filter. A TM mode dielectric filter may exactly satisfy the above demand. Compared with a common metal coaxial filter of the same volume, it may have about a 30% increase of a quality factor value (Q value). The TM mode dielectric filter may be made up of several TM mode dielectric resonators cascaded in a particular way.

A typical TM mode dielectric resonator includes a dielectric resonant column and a metal resonant cavity. Also, top and bottom end surfaces of the dielectric resonant column need to closely fit in with top and bottom end surfaces of the metal resonant cavity, so that a current can smoothly flow through a contact surface between the dielectric resonant column and the metal resonant cavity, therefore forming a good current loop. In addition, because there is a strong current on the contact surface between the top and bottom surfaces of the dielectric resonant column and the metal resonant cavity of the TM mode resonator, good contact between the two contact surfaces is essential and important. Therefore, in a design process of the TM mode dielectric resonator, it is necessary to guarantee good contact between the contact surfaces and good structure reliability with respect to a structure and/or process, so as to achieve a good Q value and passive intermodulation (PIM) value of the TM mode resonator and thus provide stable performance.

The conventional dielectric resonator cannot achieve good contact between the contact surfaces, or its assembly is complex, or a welding process is required to cause the top and bottom end surfaces of the dielectric resonant column to contact the top and bottom end surfaces of the metal cavity. Because the welding cost is high, and the stability of the welding process seriously affects the product yield, it is necessary to strictly control the welding process. In addition, the existence of a welding point may lead to unstable performance when the dielectric resonant column vibrates.

SUMMARY OF THE INVENTION

Embodiments of the present invention provide a transverse magnetic mode dielectric resonator, a transverse magnetic mode dielectric filter, and a base station, so as to achieve good contact between contact surfaces and facilitate assembly.

One aspect of the present invention provides a transverse magnetic mode dielectric resonator, which includes a resonant cavity with an opening at one end of the resonant cavity, and a dielectric resonant column positioned in the resonant cavity, where a bottom end surface of the dielectric resonant column contacts an inner bottom surface of the resonant cavity, and the inner surface of the resonant cavity is covered with conductive material; the transverse magnetic mode dielectric resonator further includes:

a thin cover board covering the opening and a thick cover board covering the thin cover board, where surfaces of the thin cover board and the thick cover board are covered with conductive material; and a slot arranged on a surface of the thick cover board where the thick cover board contacts the thin cover board, where the slot is filled with filler, and the filler is configured to cause the thin cover board to generate elastic deformation when the thick cover board covers the thin cover board.

Another aspect of the present invention further provides a transverse magnetic mode dielectric resonator, which includes a resonant cavity with an opening at one end, and a dielectric resonant column positioned in the resonant cavity, where a bottom end surface of the dielectric resonant column contacts an inner bottom surface of the resonant cavity (201), the inner surface of the resonant cavity is covered with conductive material, and the height of the dielectric resonant column is greater than the height from the inner bottom surface of the resonant cavity to the opening at one end of the resonant cavity; the transverse magnetic mode dielectric resonator further includes:

a thin cover board covering the opening and a thick cover board covering the thin cover board, where surfaces of the thin cover board and the thick cover board are covered with conductive material.

Another aspect of the present invention further provides a transverse magnetic mode dielectric resonator, which includes a resonant cavity with an opening at one end, and a dielectric resonant column positioned in the resonant cavity, where a bottom end surface of the dielectric resonant column contacts an inner bottom surface of the resonant cavity, the inner surface of the resonant cavity is covered with conductive material, and the height of the dielectric resonant column is greater than the height from the inner bottom surface to the opening at one end; the transverse magnetic mode dielectric resonator further includes:

a thick cover board covering the opening, where a lower bottom surface of the thick cover board contacts a top end surface of the dielectric resonant column, a slot is arranged on the lower bottom surface and/or an upper top surface of the thick cover board, and a surface of the thick cover board is covered with conductive material.

Another aspect of the present invention further provides a transverse magnetic mode dielectric filter, which includes the transverse magnetic mode dielectric resonator as described above.

An embodiment of the present invention further provides a base station, which includes a transverse magnetic mode dielectric filter according to the embodiments of the present invention.

It may be seen from the above technical solutions according to the embodiments of the invention that, the transverse magnetic mode dielectric resonator according to the embodiments of the present invention has good structure stability, convenient assembly, and strong realizability, thereby being suitable for mass production and having good mass production consistency.

BRIEF DESCRIPTION OF THE DRAWINGS

To illustrate the technical solutions in the embodiments of the present invention or the prior art more clearly, the accompanying drawings required in the description of the embodiments or the prior art are briefly described hereunder. Evidently, the accompanying drawings in the following description illustrate only some embodiments of the present invention, and those of ordinary skill in the art may obtain other drawings based on these drawings without creative efforts.

DETAILED DESCRIPTION OF THE EMBODIMENTS

The technical solutions in the embodiments of the present invention are hereinafter described clearly and completely with reference to the accompanying drawings in the embodiments of the present invention. It is evident that the described embodiments are only part of the embodiments, but not all of the embodiments. All other embodiments that those of ordinary skill in the art obtain based on the embodiments of the present invention without creative efforts are all within the protection scope of the present invention.

Figure 1:
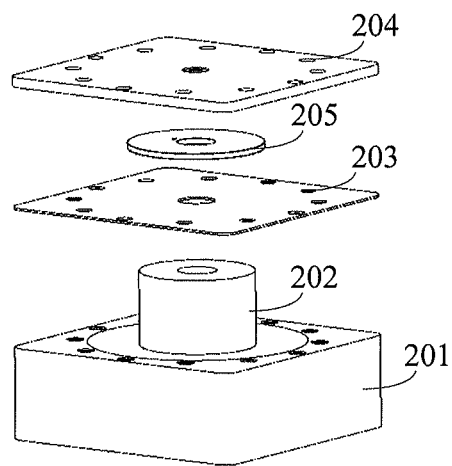
FIG. 1 is a schematic structural diagram of a TM mode dielectric resonator according to an embodiment of the present invention.

The following describes the transverse magnetic mode dielectric resonators provided by the embodiments of the present invention. FIG. 1 describes a structure of a transverse magnetic mode dielectric resonator according to an embodiment of the present invention. As shown in FIG. 1, the transverse magnetic mode dielectric resonator includes:

a resonant cavity 201 with an opening at one end of the resonant cavity, and a dielectric resonant column 202 positioned in the resonant cavity 201, where a bottom end surface of the dielectric resonant column 202 contacts an inner bottom surface of the resonant cavity 201, and the inner surface of the resonant cavity 201 is covered with conductive material (not shown), where the height of the dielectric resonant column 202 may be greater than the height from the inner bottom surface of the resonant cavity 201 to the opening at one end of the resonant cavity 201; the height of the dielectric resonant column 202 may also be smaller than the height from the inner bottom surface of the resonant cavity 201 to the opening at one end of the resonant cavity 201; the height of the dielectric resonant column 202 may also be equal to the height from the inner bottom surface of the resonant cavity 201 to the opening at one end of the resonant cavity 201. An illustration of the conductive material is not necessary for understanding the invention and thus is not depicted in the drawings.

It should be noted that, in the embodiment of the present invention, the conductive material may be conductive metal, e.g., gold, silver, and copper. In another embodiment of the present invention, the conductive material may also be non-metal material covered by conductive material. At least one of a top end surface and the bottom end surface of the dielectric resonant column is covered with conductive material.

The resonant cavity 201 in the embodiment of the present invention may be a metal resonant cavity.

In another embodiment of the present invention which can be by reference to the FIG. 1, a top end surface and/or bottom end surface of the dielectric resonant column 202 may be covered with conductive material. The covering may be achieved by performing a metallized surface treatment on the top end surface and/or bottom end surface of the dielectric resonant column 202. In order to guarantee efficient assembly and ensure the stabilization of the transverse magnetic mode dielectric resonator after the assembly, in an embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing column 206 arranged on the inner bottom surface of the resonant cavity 201 (which can be by reference to the FIGS. 6, 6a 6b, 6c, or 6d). When the dielectric resonant column 202 is positioned in the resonant cavity 201, the spacing column 206 may be positioned in a hollow portion of the dielectric resonant column 202, a horizontal cross section of the spacing column 206 may be a circle, and the diameter of the spacing column 206 is smaller than or equal to that of the hollow portion of the dielectric resonant column 202. In another embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing slot arranged on the inner bottom surface of the resonant cavity 201. When the dielectric resonant column 202 is positioned in the resonant cavity 201, the dielectric resonant column 202 is directly positioned in the spacing slot, and the diameter of the spacing slot is greater than or equal to that of the dielectric resonant column 202. A horizontal cross section of the spacing slot may be a circle, or a concentric circular ring.

A thin cover board 203 covering the opening of the resonant cavity 201, and a thick cover board 204 covering the thin cover board 203 are also included, where the surfaces of the thin cover board 203 and the thick cover board 204 are covered with conductive material. In an embodiment of the present invention, the thick cover board may be a metal thick cover board, and the thin cover board may be a metal thin cover board. A slot is arranged on the surface of the thick cover board 204 contacting the thin cover board 203 and the slot is filled with filler 205, and the filler 205 is configured to cause the thin cover board 203 to generate elastic deformation when the thick cover board 204 covers the thin cover board 203. In this way, the thin cover board 203 closely contacts the top end surface of the dielectric resonant column 202, therefore achieving good conductivity at a contact portion between the thin cover board 203 and the dielectric resonant column 202; moreover, the bottom end surface of the dielectric resonant column 202 closely contacts the inner bottom surface of the resonant cavity 201, therefore achieving good conductivity at a contact portion between the inner bottom surface of the resonant cavity 201 and the dielectric resonant column 202.

The thickness of the filler 205 may depend on the height of the slot on the thick cover board 204, and a height relationship between the top end surface of the dielectric resonant column 202 and the resonant cavity 201. For example, when the slot on the thick cover board 204 has a certain height, if the top end surface of the dielectric resonant column 202 is above the resonant cavity 201, the thickness of the filler 205 may be smaller than or equal to or greater than the height of the slot on the thick cover board 204; if the top end surface of the dielectric resonant column 202 is below the resonant cavity 201, the thickness of the filler 205 must be greater than the height of the slot on the thick cover board 204; and if the top end surface of the dielectric resonant column 202 is flush with an upper top surface of the resonant cavity 201, the thickness of the filler 205 may be greater than the height of the slot on the thick cover board 204. The filler in the embodiments of the present invention may be any object that may be compressed and may fill the slot on the thick cover board 204. Filler material may be plastic or a metal spring, or may be air or vacuum, such as aerated filler. An illustration of the respective heights of the dielectric resonant column relative to the height of the resonant cavity is not necessary for understanding the invention and thus is not depicted in the drawings.

Figure 2:
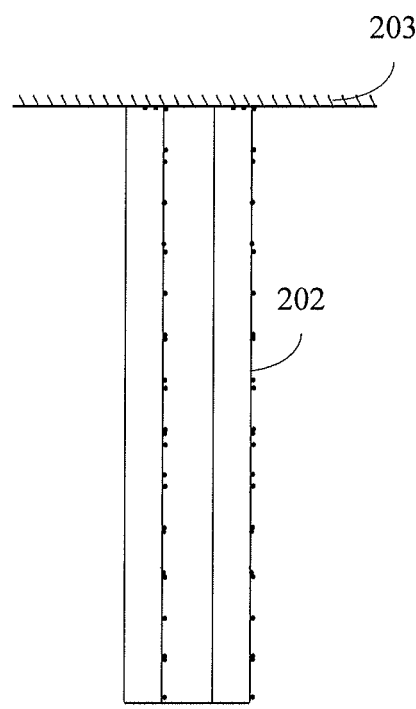
FIG. 2 is a schematic diagram of a longitudinal section of a contact place of a thin cover board and a dielectric resonant column according to an embodiment of the present invention.
Figure 3:
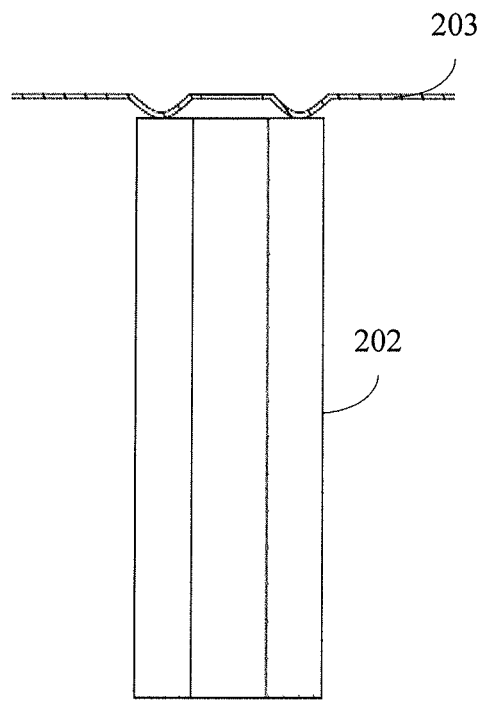
FIG. 3 is a schematic diagram of a longitudinal section of a contact place of a thin cover board and a dielectric resonant column according to another embodiment of the present invention.
Figure 4:
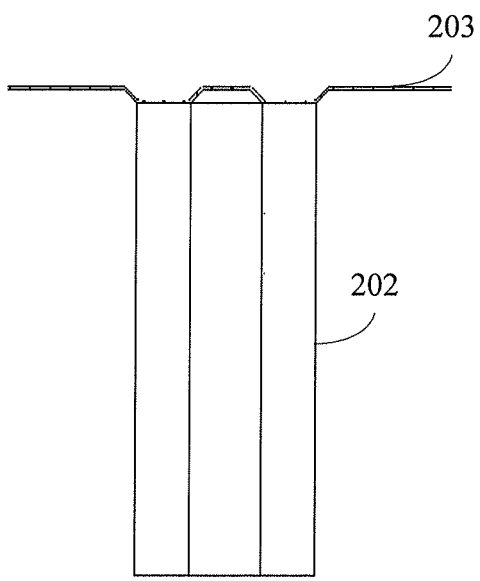
FIG. 4 is a schematic diagram of a longitudinal section of a contact place of a thin cover board and a dielectric resonant column according to another embodiment of the present invention.

A longitudinal section of a contact place of a thin cover board 203 and the dielectric resonant column 202 may be a square, a circular arc, or an inverted trapezoid, etc. Certainly, the embodiments of the present invention do not exclude the possibility that the longitudinal section of a contact place of a thin cover board 203 and the dielectric resonant column 202 is an irregular graphic. FIG. 2 is a schematic diagram of a longitudinal section of a contact place of a thin cover board 203 and a dielectric resonant column 202 in an embodiment of the present invention. As shown in FIG. 2, the longitudinal section of a contact place of a thin cover board 203 and the dielectric resonant column 202 is a square. FIG. 3 is a schematic diagram of a longitudinal section of a contact place of a thin cover board 203 and a dielectric resonant column 202 in another embodiment of the present invention. As shown in FIG. 3, the longitudinal section of a contact place of a thin cover board 203 and the dielectric resonant column 202 is a circular arc. FIG. 4 is a schematic diagram of a longitudinal section of a contact place of a thin cover board 203 and a dielectric resonant column 202 in another embodiment of the present invention. As shown in FIG. 4, the longitudinal section of a contact place of a thin cover board 203 and the dielectric resonant column 202 is an inverted trapezoid.

In an embodiment of the present invention, based on FIG. 1, the thin cover board 203 may fixedly cover the opening of a resonant cavity 201 through screws (not shown); and a thick cover board 204 may also fixedly cover the thin cover board 203 through screws. Certainly, the embodiments of the present invention do not exclude the possibility that the thin cover board 203 fixedly covers the opening of the resonant cavity 201 in other ways, or that the thick cover board 204 fixedly covers the thin cover board 203 in other ways, for example, the thick cover board, the thin cover board, and the resonant cavity are fixed together through screws.

It may be seen from the above that, the embodiments may use the thin cover board to cover the resonant cavity, and then use the thick cover board to cover the thin cover board, and a slot is arranged on a surface of the thick cover board where the thick cover board contacts the thin cover board, and the slot is filled with filler, so that the filler may cause the thin cover board to generate elastic deformation when the thick cover board covers the thin cover board. Therefore, the thin cover board closely contacts the top end surface of the dielectric resonant column, the bottom end surface of the dielectric resonant column closely contacts the inner bottom surface of the resonant cavity, and the transverse magnetic mode dielectric resonator in use may obtain a good Q value and PIM value. In addition, each component in the transverse magnetic mode dielectric resonator in the embodiments may be connected by means other than welding, so that the transverse magnetic mode dielectric resonator has not only good structure stability, but also convenient assembly, and strong realizability, therefore being suitable for mass production and having good mass production consistency.

Figure 5:
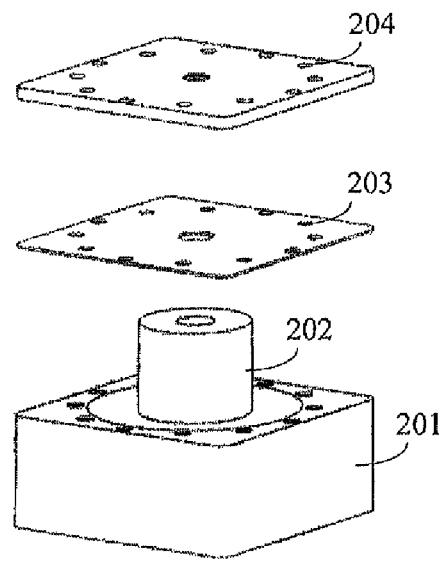
FIG. 5 is a schematic structural diagram of a TM mode dielectric resonator according to another embodiment of the present invention.

FIG. 5 describes a structure of a transverse magnetic mode dielectric resonator according to an embodiment of the present invention. As shown in FIG. 5, the transverse magnetic mode dielectric resonator includes:

a resonant cavity 201 with an opening at one end, and a dielectric resonant column 202 positioned in the resonant cavity 201, where a bottom end surface of the dielectric resonant column 202 contacts an inner bottom surface of the resonant cavity 201, and the inner surface of the resonant cavity 201 is covered with conductive material, where, the height of the dielectric resonant column 202 is greater than the height from the inner bottom surface of the resonant cavity 201 to the opening at one end of the resonant cavity 201.

In another embodiment of the present invention which can be by reference to the FIG. 1, a top end surface and/or bottom end surface of the dielectric resonant column 202 is covered with conductive material. In order to guarantee efficient assembly and ensure the stabilization of the transverse magnetic mode dielectric resonator after the assembly, in an embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing column 206 arranged on the inner bottom surface of the resonant cavity 201 (which can be by reference to FIG. 6a, 6b, 6c, or 6d). When the dielectric resonant column 202 is positioned in the resonant cavity 201, the spacing column may be positioned in a hollow portion of the dielectric resonant column 202, a horizontal cross section of the spacing column may be a circle, and the diameter of the spacing column is smaller than or equal to that of the hollow portion of the dielectric resonant column 202. In another embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing slot (not shown) arranged on the inner bottom surface of the resonant cavity 201. When the dielectric resonant column 202 is positioned in the resonant cavity 201, the dielectric resonant column 202 is positioned in the spacing slot, and the diameter of the spacing slot is greater than or equal to that of the dielectric resonant column 202. A horizontal cross section of the spacing slot may be a circle, or a concentric circular ring. An illustration of the spacing slot is not necessary for understanding the invention and thus is not depicted in the drawings.

A thin cover board 203 covering the opening of the resonant cavity 201, and a thick cover board 204 covering the thin cover board 203 are also included, where the surfaces of the thin cover board 203 and the thick cover board 204 are covered with conductive material. Because the height of the dielectric resonant column 202 is greater than the height from the inner bottom surface of the resonant cavity 201 to the opening at one end of the resonant cavity 201, the top end surface of the dielectric resonant column 202 is above the resonant cavity 201. When the thick cover board 204 is used to cover the thin cover board 203, the thin cover board 203 closely contacts the top end surface of the dielectric resonant column 202, therefore achieving good conductivity at a contact portion between the thin cover board 203 and the dielectric resonant column 202; moreover, the bottom end surface of the dielectric resonant column 202 closely contacts the inner bottom surface of the resonant cavity 201, therefore achieving good conductivity at a contact portion between the bottom end surface of the dielectric resonant column 202 and the inner bottom surface of the resonant cavity 201.

A longitudinal section of a contact place of a thin cover board 203 and the dielectric resonant column 202 may be a square, a circular arc, or an inverted trapezoid, etc.

In an embodiment of the present invention, based on FIG. 5, the thin cover board 203 may fixedly cover the opening of the resonant cavity 201 through screws (not shown); and the thick cover board 204 may also fixedly cover the thin cover board 203 through screws. Certainly, the embodiments of the present invention do not exclude the possibility that the thin cover board 203 fixedly covers the opening of the resonant cavity 201 in other ways, or that the thick cover board 204 fixedly covers the thin cover board 203 in other ways, e.g., the thick cover board, the thin cover board, and the resonant cavity are fixed together through screws.

It may be seen from the above that, the embodiments may use the thin cover board to cover the resonant cavity, and then use the thick cover board to cover the thin cover board, where the height of the dielectric resonant column is greater than the height from the inner bottom surface of the resonant cavity to the opening at one end, so the top end surface of the dielectric resonant column is above the resonant cavity. When the thick cover board is used to cover the thin cover board, the thin cover board closely contacts the top end surface of the dielectric resonant column, the bottom end surface of the dielectric resonant column closely contacts the inner bottom surface of the resonant cavity, and the transverse magnetic mode dielectric resonator in use may obtain a good Q value and PIM value. In addition, each component in the transverse magnetic mode dielectric resonator in the embodiments may be connected by other means than welding, so the transverse magnetic mode dielectric resonator has not only good structure stability, but also convenient assembly, and strong realizability, thereby being suitable for mass production and having good mass production consistency.

Because the magnetic mode dielectric resonator according to the embodiments of the present invention does not need a welding process, it is simple to assemble. FIGS. 6a-6d describe a structure of a magnetic mode dielectric resonator in various stages of an assembly process of a magnetic mode dielectric resonator according to an embodiment of the present invention.

Figure 6A:
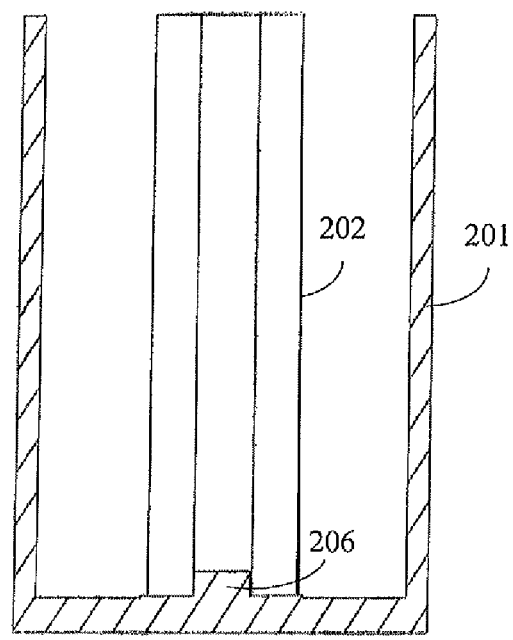
FIGS. 6a, 6b, 6c, and 6d are schematic structural diagrams of a magnetic mode dielectric resonator in various stages of an assembly process of a magnetic mode dielectric resonator according to an embodiment of the present invention.

As shown in FIG. 6a, a dielectric resonant column 202 is positioned in a resonant cavity 201, a bottom end surface of the dielectric resonant column 202 contacts an inner bottom surface of the resonant cavity, and a contact portion between the bottom end surface of the dielectric resonant column 202 and the inner bottom surface of the resonant cavity is defined by a spacing column.

Figure 6B:
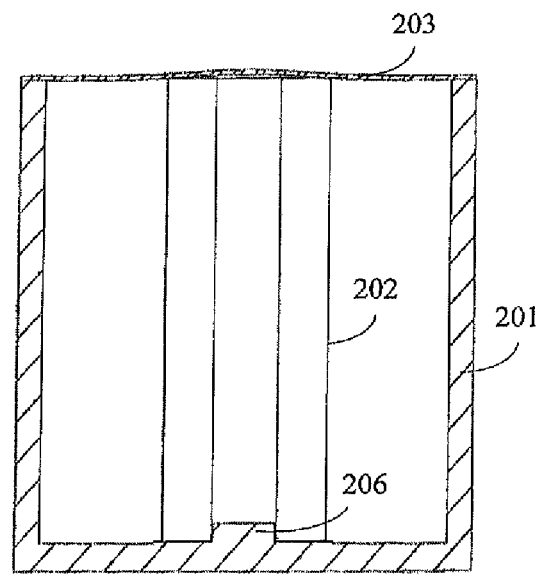

As shown in FIG. 6b, a dielectric resonant column 202 is positioned in a resonant cavity 201, a bottom end surface of the dielectric resonant column 202 contacts an inner bottom surface of the resonant cavity, and a thin cover board 203 covers an opening of the resonant cavity 201. Specifically, based on FIG. 6b, the thin cover board 203 may fixedly cover the opening of the resonant cavity 201 through screws (not shown). The figure shows that a top end surface of the dielectric resonant column 202 is above the resonant cavity 201.

Figure 6C:
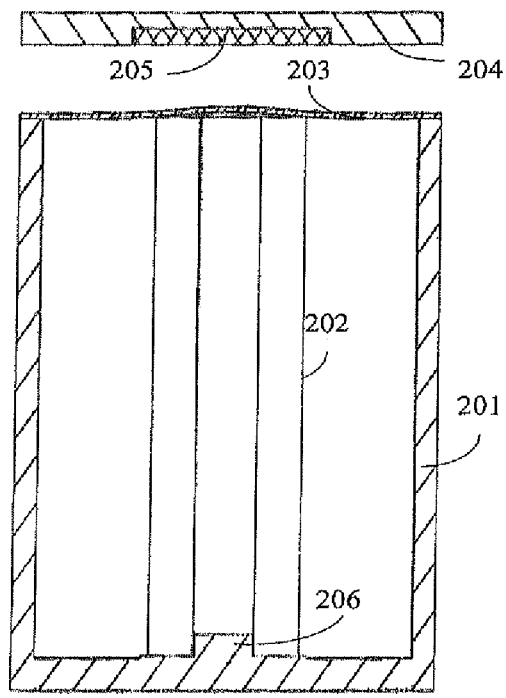

As shown in FIG. 6c, a dielectric resonant column 202 is positioned in a resonant cavity 201, a bottom end surface of the dielectric resonant column 202 contacts an inner bottom surface of the resonant cavity, a thin cover board 203 covers an opening of the resonant cavity 201, a thick cover board 204 covers the thin cover board 203, and a slot arranged on the surface where the thick cover board 204 contacts the thin cover board 203 is filled with filler 205. Specifically, the thick cover board 204 may fixedly cover the thin cover board 203 through screws.

Figure 6D:
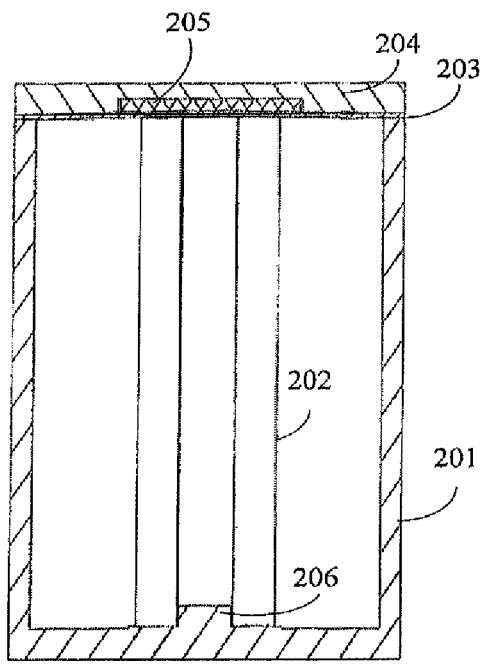

FIG. 6d describes a structure of an assembled transverse magnetic mode dielectric resonator. An example of the structure as shown in FIG. 6d, a dielectric resonant column 202 is positioned in a resonant cavity 201, a bottom end surface of the dielectric resonant column 202 contacts an inner bottom surface of the resonant cavity, a thin cover board 203 covers an opening of the resonant cavity 201, a thick cover board 204 covers the thin cover board 203, and a slot arranged on the surface where the thick cover board 204 contacts the thin cover board 203 is filled with filler 205. When the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing column 206 arranged on the inner bottom surface of the resonant cavity 201. When the dielectric resonant column 202 is positioned in the resonant cavity 201, the spacing column 206 may be positioned in a hollow portion of the dielectric resonant column 202, a horizontal cross section of the spacing column 206 may be a circle, and the diameter of the spacing column 206 is smaller than or equal to that of the hollow portion of the dielectric resonant column 202.

As can be seen from the description of FIGS. 6a-6d, the transverse magnetic mode dielectric resonator according to the embodiments of the present invention does not need a complex process (e.g., welding), so it is simple to assemble.

Figure 7:
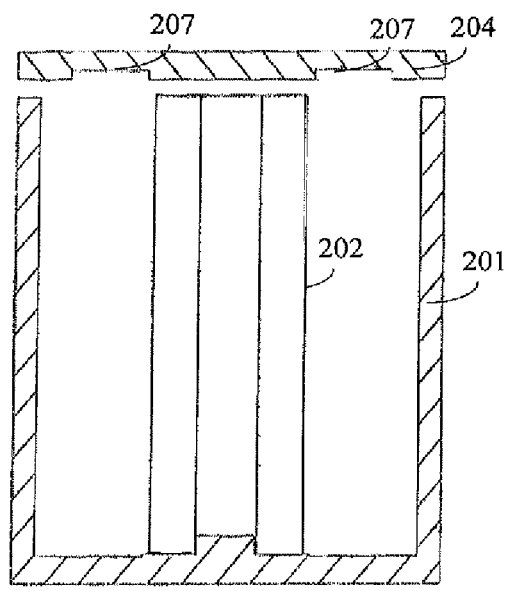
FIG. 7 is a schematic structural diagram of a TM mode dielectric resonator according to another embodiment of the present invention.

FIG. 7 describes a structure of a transverse magnetic mode dielectric resonator according to an embodiment of the present invention. As shown in FIG. 7, the transverse magnetic mode dielectric resonator includes:

a resonant cavity 201 with an opening at one end, and a dielectric resonant column 202 positioned in the resonant cavity 201, where a bottom end surface of the dielectric resonant column 202 contacts an inner bottom surface of the resonant cavity 201, and the height of the dielectric resonant column 202 is greater than the height from the inner bottom surface of the resonant cavity 201 to the opening at one end of the resonant cavity 201.

In another embodiment of the present invention, a top end surface and/or bottom end surface of the dielectric resonant column 202 is covered with conductive material. In order to guarantee efficient assembly and ensure the stabilization of the transverse magnetic mode dielectric resonator after the assembly, in an embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing column arranged on the inner bottom surface of the resonant cavity 201. When the dielectric resonant column 202 is positioned in the resonant cavity 201, the spacing column may be positioned in a hollow portion of the dielectric resonant column 202, a horizontal cross section of the spacing column may be a circle, and the diameter of the spacing column is smaller than or equal to that of the hollow portion of the dielectric resonant column 202. In another embodiment of the present invention, when the inner bottom surface of the resonant cavity 201 contacts the bottom end surface of the dielectric resonant column 202, the location where the inner bottom surface of the resonant cavity 201 contacts the bottom end surface of the dielectric resonant column 202 may be defined by a spacing slot arranged on the inner bottom surface of the resonant cavity 201. When the dielectric resonant column 202 is positioned in the resonant cavity 201, the dielectric resonant column 202 is positioned in the spacing slot, and the diameter of the spacing slot is greater than or equal to that of the dielectric resonant column 202. A horizontal cross section of the spacing slot may be a circle, or a concentric circular ring.

A thick cover board 204 covering the opening of the resonant cavity 201 is also included, where the surface of the thick cover board 204 is covered with conductive material. A lower bottom surface of the thick cover board 204 contacts the top end surface of the dielectric resonant column 202, and a slot 207 is arranged on the lower bottom surface and/or upper top surface of the thick cover board 204. FIG. 7 shows that the slot is arranged on the lower bottom surface of the thick cover board 204. A horizontal cross section of the slot 207 may be a circular ring. The slot may be such that the thickness of the thick cover board 204 in a slot portion is smaller than the thickness of a contact portion between the thick cover board 204 and the dielectric resonant column 202. Therefore, the slot portion of the thick cover board 204 may generate buckling deformation, and enough elastic force is generated to cause the lower bottom surface of the thick cover board 204 to contact the top end surface of the dielectric resonant column 202 well, therefore achieving good conductivity at the contact portion between the thick cover board 204 and the dielectric resonant column 202; moreover, the bottom end surface of the dielectric resonant column 202 is caused to contact the inner bottom surface of the resonant cavity 201 well, therefore achieving good conductivity at a contact portion between the bottom end surface of the dielectric resonant column 202 and the inner bottom surface of the resonant cavity 201.

When the slot is arranged on the lower bottom surface and the upper top surface of the thick cover board 204, the slot portion may generate more significant buckling deformation and greater elastic force, thereby further ensuring good contact between the lower bottom surface of the thick cover board 204 and the top end surface of the dielectric resonant column 202. In an embodiment of the present invention, the slot arranged on the upper bottom surface and the slot arranged on the lower bottom surface may have a symmetric distribution.

It may be seen from the above that, the thick cover board covering the opening of the resonant cavity in the embodiments directly contacts the top end surface of the dielectric resonant column, and the height of the dielectric resonant column is greater than the height from the inner bottom surface of the resonant cavity to the opening at one end, therefore ensuring that the lower bottom surface of the thick cover board closely fits in with the top end surface of the dielectric resonant column. In addition, a slot is arranged on the lower bottom surface of the thick cover board, so that the thickness of the thick cover board in the slot portion is smaller than the thickness of the contact portion between the thick cover board and the dielectric resonant column, and that the slot portion of the thick cover board may generate buckling deformation, in order to generate enough elastic force to cause the lower bottom surface of the thick cover board to contact the top end surface of the dielectric resonant column well. In another embodiment of the present invention, a slot is also arranged on the upper bottom surface of the thick cover board, so that the slot portion may generate more significant buckling deformation and greater elastic force, thereby further ensuring good contact between the lower bottom surface of the thick cover board and the top end surface of the dielectric resonant column, and good structure stability of the transverse magnetic mode dielectric resonator. In addition, each component in the transverse magnetic mode dielectric resonator in the embodiments may be connected by other means than welding, so the transverse magnetic mode dielectric resonator has not only good structure stability, but also convenient assembly, and strong realizability, thereby being suitable for mass production and having good mass production consistency.

An embodiment of the present invention further provides a transverse magnetic mode dielectric filter, which includes a transverse magnetic mode dielectric resonator according to the embodiments of the present invention. According to different performance required for the transverse magnetic mode dielectric filter, a different number of transverse magnetic mode dielectric resonators cascaded (not shown) to obtain the transverse magnetic mode dielectric filter of desired performance. The specific obtaining mode may refer to the conventional mode in the prior art, and the present invention is not limit thereto. An illustration of the cascaded transverse magnetic mode dielectric resonators is not necessary for understanding the invention and thus are not depicted in the drawings.

An embodiment of the present invention further provides a base station (not shown), which includes a transverse magnetic mode dielectric filter according to the embodiments of the present invention, and the transverse magnetic mode dielectric filter is specifically located in a portion of the antenna system of the base station. An illustration of the base station is not necessary for understanding the invention and thus is not depicted in the drawings.

Although the principle and implementation of the present invention are described in detail with reference to exemplary embodiments herein, the description of the above embodiments is merely used to help understand the method and the idea of the present invention. In addition, those of ordinary skill in the art can make some variations with respect to the implementation and applicability according to the idea of the present invention. To sum up, the specification should not be construed as limitations on the present invention.

What is claimed is:

1. A transverse magnetic mode dielectric resonator, comprising:
   a resonant cavity with inner surfaces including an inner bottom surface, and with an opening at one end of the resonant cavity, and a dielectric resonant column positioned in the resonant cavity, wherein a bottom end surface of the dielectric resonant column contacts the inner bottom surface of the resonant cavity, and the inner surfaces of the resonant cavity are covered with conductive material, the transverse magnetic mode dielectric resonator further comprising:

a thin cover board covering the opening and a thick cover board covering the thin cover board, wherein surfaces of the thin cover board and the thick cover board are covered with conductive material; and a slot arranged on a surface of the thick cover board where the thick cover board contacts the thin cover board, wherein the slot is filled with filler, and the filler is a compressible material that causes the thin cover board to experience elastic deformation when the thick cover board with the filler covers the thin cover board, wherein the filler fills in the slot arranged on the thick cover board.

2. The transverse magnetic mode dielectric resonator according to claim 1, wherein a longitudinal section of a contact place of the thin cover board where the thin cover board contacts the dielectric resonant column is a square, a circular arc, or an inverted trapezoid.

3. The transverse magnetic mode dielectric resonator according to claim 1, wherein at least one of a top end surface and the bottom end surface of the dielectric resonant column is covered with conductive material.

4. The transverse magnetic mode dielectric resonator according to claim 1, wherein the filler of compressible material comprises one of a plastic or a metal spring.

5. The transverse magnetic mode dielectric resonator according to claim 1, wherein: a thickness of the filler depends on a height of the slot on the thick cover board, and a height relationship between a top end surface of the dielectric resonant column and the resonant cavity.

6. The transverse magnetic mode dielectric resonator according to claim 5, wherein:

a height of the dielectric resonant column is greater than a height from the inner bottom surface of the resonant cavity to the opening at the one end of the resonant cavity.

7. The transverse magnetic mode dielectric resonator according to claim 5, wherein:

the height of the dielectric resonant column is smaller than a height from the inner bottom surface of the resonant cavity to the opening at the one end of the resonant cavity.

8. The transverse magnetic mode dielectric resonator according to claim 5, wherein:

the height of the dielectric resonant column is equal to a height from the inner bottom surface of the resonant cavity to the opening at the one end of the resonant cavity.

9. The transverse magnetic mode dielectric resonator according to claim 1, wherein: at a location where the inner bottom surface of the resonant cavity contacts the bottom end surface of the dielectric resonant column, the location is defined by a spacing column or a spacing slot arranged on the inner bottom surface of the resonant cavity.

10. A base station, comprising a transverse magnetic mode dielectric filter which includes a transverse magnetic mode dielectric resonator, wherein the transverse magnetic mode dielectric resonator comprises:

a resonant cavity with inner surfaces including an inner bottom surface, and with an opening at one end of the resonant cavity, and a dielectric resonant column positioned in the resonant cavity, wherein a bottom end surface of the dielectric resonant column contacts the inner bottom surface of the resonant cavity, and the inner surfaces of the resonant cavity are covered with conductive material, the transverse magnetic mode dielectric resonator further comprising:

a thin cover board covering the opening and a thick cover board covering the thin cover board, wherein surfaces of the thin cover board and the thick cover board are covered with conductive material; and a slot arranged on a surface of the thick cover board where the thick cover board contacts the thin cover board, wherein the slot is filled with filler, and the filler is a compressible material that causes the thin cover board to experience elastic deformation when the thick cover board with the filler covers the thin cover board, wherein the filler fills in the slot arranged on the thick cover board.

11. The base station according to claim 10, wherein a longitudinal section of a contact place of the thin cover board where the thin cover board contacts the dielectric resonant column is a square, a circular arc, or an inverted trapezoid.

12. The base station according to claim 10, wherein at least one of a top end surface and the bottom end surface of the dielectric resonant column is covered with conductive material.

13. The base station according to claim 10, wherein the filler of compressible material comprises one of a plastic or a metal spring.

14. The base station according to claim 10, wherein: a thickness of the filler depends on a height of the slot on the thick cover board, and a height relationship between a top end surface of the dielectric resonant column and the resonant cavity.

15. The base station according to claim 14, wherein:

the height relationship of the dielectric resonant column is greater than, smaller than or equal to a height from the inner bottom surface of the resonant cavity to the opening at the one end of the resonant cavity.

* * * * *